(12) United States Patent
Vollmar

(10) Patent No.: US 11,192,569 B2
(45) Date of Patent: Dec. 7, 2021

(54) SEATING/LYING SUPPORT

(71) Applicant: Mariam Vollmar, Seybothenreuth (DE)

(72) Inventor: Mariam Vollmar, Seybothenreuth (DE)

( * ) Notice: Subject to any disclaimer, the term of this patent is extended or adjusted under 35 U.S.C. 154(b) by 281 days.

(21) Appl. No.: 16/314,541

(22) PCT Filed: Jul. 3, 2017

(86) PCT No.: PCT/EP2017/066463
§ 371 (c)(1),
(2) Date: Dec. 31, 2018

(87) PCT Pub. No.: WO2018/002381
PCT Pub. Date: Jan. 4, 2018

(65) Prior Publication Data
US 2020/0385046 A1    Dec. 10, 2020

(30) Foreign Application Priority Data
Jul. 1, 2016  (DE) ..................... 10 2016 112 086.3

(51) Int. Cl.
| B62B 9/22 | (2006.01) |
| B62B 9/18 | (2006.01) |
| B62B 7/12 | (2006.01) |
| B62B 9/10 | (2006.01) |
| A63G 19/00 | (2006.01) |

(52) U.S. Cl.
CPC ............. B62B 9/22 (2013.01); B62B 7/12 (2013.01); B62B 9/104 (2013.01); B62B 9/18 (2013.01); *A63G 19/00* (2013.01)

(58) Field of Classification Search
CPC .. B62B 9/22; B62B 9/104; B62B 9/18; B62B 9/102; B62B 9/10; B62B 9/185; B62B 7/12; B62B 7/123; A63G 19/00

USPC ....................................................... 280/47.41
See application file for complete search history.

(56) References Cited

U.S. PATENT DOCUMENTS

| 1,336,725 | A | * | 4/1920 | Biwoin | ...................... B62B 9/22 |
| | | | | | 280/31 |
| 1,353,340 | A | | 9/1920 | Heitzenreder, Jr. | |
| 1,410,476 | A | * | 3/1922 | Keane | ................... A61G 7/0573 |
| | | | | | 601/62 |
| 1,540,065 | A | * | 6/1925 | Fritz | ......................... B62B 9/22 |
| | | | | | 280/31 |
| 1,561,639 | A | | 11/1925 | Edgar | |
| 1,761,253 | A | | 6/1930 | Brockway | |
| 1,791,777 | A | | 2/1931 | Webb | |
| 4,772,070 | A | | 9/1988 | Leto, Jr. et al. | |
| 7,814,587 | B2 | * | 10/2010 | Thomas | .................... A47D 9/04 |
| | | | | | 5/109 |

(Continued)

FOREIGN PATENT DOCUMENTS

| CN | 86208106 U | 9/1987 |
| CN | 2222666 Y | 3/1996 |

(Continued)

*Primary Examiner* — John D Walters
(74) *Attorney, Agent, or Firm* — McGlew and Tuttle, P.C.

(57) ABSTRACT

A seating/lying support (7) includes at least two seating/lying support elements (7a, 7b, 7c, 7d) which are movably interconnected, and at least one bearing element (8.1, 8.2, 8.3, 8.4). The at least one bearing element (8.1, 8.2, 8.3, 8.4) is connected to the seating/lying support elements (7a, 7b, 7c, 7d) such that a movement of the seating/lying support elements (7a, 7b, 7c, 7d) relative to one another can be produced.

16 Claims, 6 Drawing Sheets

(56) References Cited

U.S. PATENT DOCUMENTS

| | | | | |
|---|---|---|---|---|
| 9,149,403 B2 * | 10/2015 | Turner | ................ | A61G 7/0514 |
| 2015/0182027 A1 * | 7/2015 | Chang | .................... | A47C 9/002 |
| | | | | 297/344.1 |

FOREIGN PATENT DOCUMENTS

| | | | |
|---|---|---|---|
| CN | 1291151 | A | 4/2001 |
| CN | 2468475 | Y | 1/2002 |
| CN | 2477172 | Y | 2/2002 |
| CN | 2480266 | Y | 3/2002 |
| CN | 201501454 | U | 6/2010 |
| DE | 465 914 | C | 9/1928 |
| DE | 37 28 408 | A1 | 3/1989 |
| DE | 42 07 639 | A1 | 9/1993 |
| GB | 21 975 | A | 5/1914 |
| GB | 320474 | A | 10/1929 |
| GB | 469 278 | A | 7/1937 |
| JP | 2004242727 | A | 9/2004 |
| JP | 2015085116 | A | 5/2015 |
| KR | 20030039431 | A | 5/2003 |
| KR | 20110002900 | A | 1/2011 |
| KR | 20130079454 | A | 7/2013 |

* cited by examiner

SEATING/LYING SUPPORT

CROSS REFERENCE TO RELATED APPLICATIONS

This application is a United States National Phase Application of International Application PCT/EP2017/066463 filed Jul. 3, 2017, and claims the benefit of priority under 35 U.S.C. § 119 of German Application 10 2016 112 086.3, filed Jul. 1, 2016, the entire contents of which are incorporated herein by reference.

TECHNICAL FIELD

The present invention pertains to a sitting/lying support.

BACKGROUND

Sitting/lying supports are generally known in various embodiments especially as a part of baby carriages or strollers. Thus, in addition to baby carriages with reclining surface with support shell, which are commonly used for newborns and infants, there also are, for example, so-called sitting strollers, in which toddlers can sit in an essentially upright position. It is usually possible in these embodiments to adjust, for example, an existing seat back and optionally a foot rest by means of an adjusting or folding mechanism such that the child can possibly also assume a lying or sleeping position.

A typical baby carriage or stroller comprises here an underframe with a push handle, wherein the underframe is connected to the lying and/or sitting device and has, as a rule, three or four wheels. The wheels are usually suspended rotatably on a stationary wheel axis. An adjustable hood, which offers protection from light and/or wind and rain, is further provided at the lying and/or sitting device or on the underframe in most prior-art embodiments.

Pushable tricycles or pushable learn-to-walk toy cars are also known from the state of the art for transporting children and at the same time to prompt children to move on their own. These pushable tricycles or learn-to-walk toy cars assume both the function of a toy as well as a transport function.

Further, a baby carriage or stroller for infants, in which the sitting device is configured in the form of a horse and in which the underframe comprises a complex drive linkage, via which the wheels can be set into motion, is known from CN 86208106 U. The drive linkage is configured here such that a sequential motion of the wheels, via which a stepping motion of a horse is recreated, is generated during a recurring movement of the head of the horse, which movement is directed forward and backward. The drawback of the baby carriage or stroller according to CN 86208106 U is, however, the fact that the stepping motion of the horse is generated or imitated by repeatedly pulling and pushing the head. However, this movement pattern does not correspond to a natural movement, as it happens, for example, during horseback riding.

Active sitting of the children, which improves the body tension, as it happens, for example, during horseback riding, is not promoted with the prior-art baby carriages or strollers, so that the solutions known from the state of the art notwithstanding, there is a need to further improve sitting strollers or riding strollers in order to allow and to support healthy sitting and natural strengthening of the muscles, which is appropriate for children.

SUMMARY OF THE INVENTION object of the present invention is therefore to provide a baby carriage or stroller, which overcomes the drawbacks of the state of the art and supports, in particular, healthy sitting and brings about strengthening of the child's muscles, especially of the dorsal muscles, in a possibly playful manner and in a manner appropriate for children.

The present invention provides a sitting/lying support comprising at least two movably interconnected sitting/lying support elements and at least one bearing element. The bearing element is connected to the sitting/lying support elements such that a movement of the bearing element elements relative to one another can be produced.

In particular, healthy sitting and sitting are supported and promoted with the present sitting/lying support. By means of the connection of the bearing elements to the sitting/lying support elements, which connection is provided and set up for this purpose, these elements are moved relative to one another, as a result of which a sitting or lying person is prompted to compensate the movements of the bearing element by activation of the body's muscles, especially of the trunk and the back. This ultimately brings about a strengthening of the muscles and leads, last but not least to improved posture and can thus ultimately prevent postural defects.

At least four movably interconnected sitting/lying support elements are preferably provided. The sitting/lying support elements are likewise preferably movably interconnected via elastic elements provided for this purpose, especially via spring elements. Any type of band-shaped, rod-shaped or strip-shaped or essentially spherical or oval elements made of an elastic material may be used as elastic elements providing that a movable but secure connection of the sitting/lying support elements is established by these elements. Spring elements with a predefined spring force or tension are especially preferably used for the movable connection of the sitting/lying support elements. To prevent a potential risk of injury especially in case of the use of spring elements, the spring elements are preferably provided with a cover, for example, with a cover consisting of a textile material.

The bearing elements may be, for example, frame struts of a sitting/lying carriage, especially of a baby carriage or stroller, legs or elastic connection elements. According to the current understanding, a bearing element acts as a support for the sitting/lying support elements.

According to a preferred embodiment of the present invention, each of the movably interconnected sitting/lying support elements is connected to a spherical lower part via at least one respective elastic connection element, especially unvulcanized rubber element, the spherical lower part being mounted movably in a hollow spherical shell and the hollow spherical shell being connected to at least one leg element for mounting on a support. The at least one leg element is especially preferably equipped with a spring element. The sitting/lying support according to the present invention is used in this embodiment as a sitting surface of a chair mounted on a ball.

According to an alternative preferred embodiment of the present invention, the sitting/lying support is connected to a seat back, wherein each of the movably interconnected sitting/lying support elements is connected to at least one leg for mounting on a support. The sitting/lying support according to the present invention is likewise used as a sitting surface of a chair in this embodiment.

At least one leg may preferably be equipped with a spring element. The legs may especially preferably be connected in this case to the at least one drive element such that the legs can be put into an upward and downward motion independently from one another by the drive element. The upward and downward motions are preferably a more complex movement pattern with vertical and horizontal direction components that can be combined with one another as desired, so that the upward and downward motions are defined here as three-dimensional movement patterns. The three-dimensional movement pattern has, for example, upward, downward, forward and backward directed direction components and may preferably also comprise lateral motion components or tilting motions. The upward and downward movements of the legs, generated by means of the drive elements, are transmitted directly to the sitting/lying support elements and are introduced into same, so that the movement of the sitting/lying support can be driven, preferably controlled. A chair, which can advantageously be used in physical therapy treatments, is made available with this embodiment.

The present invention also provides a sitting/lying carriage with a sitting/lying support as defined above, wherein the sitting/lying carriage has at least one underframe and at least one sitting/lying device coupled with the underframe. The underframe comprises here at least two wheel rods and wheels connected to the wheel rods. Each of the movably interconnected sitting/lying support elements of the sitting/lying support is coupled with the underframe via at least one frame strut. The sitting/lying carriage according to the present invention is characterized especially in that each wheel rod is rotatable about an axis of rotation of the connected wheels and is equipped with at least one coupling device arranged outside the axis of rotation for coupling the frame struts, wherein a rotation of the wheel rods can be generated by a rotary motion of the wheels and wherein the generated rotation of the wheel rods is converted by means of the coupling of the frame struts to the coupling devices of the wheel rods into opposite upward and downward movements of the at least two movably interconnected sitting/lying support elements. The upward and downward movements are preferably a more complex movement pattern with vertical and horizontal direction components, so that the upward and downward movements are defined here as three-dimensional movement patterns. The three-dimensional movement pattern has, for example, upward, downward, forward and backward directed direction components and may especially preferably also comprise lateral motion components or tilting movements.

The sitting/lying carriage according to the present invention is especially a carriage suitable for transporting children, for example, a pushable baby carriage or stroller or a pullable baby carriage or stroller, for example, a children's bicycle trailer. The sitting/lying device provides a reclining surface and/or a sitting surface.

Wheel rods are defined here as parts of the underframe, which are provided for the wheel suspension and which preferably connect two wheels each to one another. A front wheel rod with front wheels as well as a rear wheel rod with rear wheels are preferably provided in the sitting/lying carriage according to the present invention. The wheel rods may be defined according to the current understanding as a fastening device or fastening rods for the wheels, the wheels being fastened to the wheel rods such that the wheel rods can be set into rotation by a rotary motion of the wheels. An axis of rotation of the wheel rod coincides here with the axis of rotation of the wheels. For example, this described rotation of the wheel rod is possible due to wheels connected permanently to the wheel rod, which wheels are mounted stationarily in relation to the wheel rod and are secured against rotation, or it is possible due to wheels that can be fixed and are only mounted in a predefined fixed position in relation to the wheel rod and are secured against rotation. The wheel rods can thus assume the function of a shaft in the sense of the present application. In the case of wheels that can be fixed, the wheel rods may also assume the function of a simple, stationary axis in an idle position of the wheels.

The wheel rods further have coupling devices for coupling the frame struts, so that the wheel rods are therefore also used as a coupling device for the sitting/lying device. The coupling devices arranged outside the axis of rotation may have various configurations and may also be defined here as coupling locations, coupling points, coupling pieces or coupling elements. In the sense of the present invention, the wheel rods are equipped with the coupling devices or also coupling sections. The coupling devices provided on the wheel rods must only ensure that the actual coupling or connection point or the coupling or connection location is located outside the axis of rotation of the wheel rod.

When pushing or pulling the sitting/lying carriage, the wheels are set into rotary motion by the forward movement. The wheel rods can likewise be set into rotation about the same axis of rotation by this rotary motion of the wheels in the sitting/lying carriage according to the present invention. The sitting/lying device is coupled with the wheel rods by means of the coupling devices arranged outside the axis of rotation such that the rotation of the wheel rods, which is generated by the rotary motion of the wheels, can be converted or transmitted or transmitted into a motion of at least two movably interconnected sitting/lying support elements. The movement of the sitting/lying support elements is represented primarily by upward and downward movements, which also comprise horizontal motion components. The sitting/lying support elements are now moved in opposite directions, i.e., upward and downward opposite each other.

The lying and/or sitting surface, on which a child lies or sits, can especially advantageously be set into motion in an especially advantageous manner with the sitting/lying carriage according to the present invention during the movement by the opposite upward and downward movements of the sitting/lying support elements, which movements are generated in the process, such that, for example, rocking or a wave-like movement is imitated, so that, for example, a calming feeling of "being carried" becomes established for the child. Further, a so-called active sitting is supported by this, during which the child seeks to compensate, for example, the movements of the sitting/lying surface by activating the trunk muscles.

The sitting/lying device is preferably configured in the form of an animal body with a torso 6a forming a sitting area, wherein the movably interconnected sitting/lying support elements are configured as movably interconnected torso sections. Four movably interconnected torso sections are especially preferably provided here, and the frame struts for coupling the torso sections to the wheel rods of the underframe are the extremities of the animal body, which are connected to the torso 6a.

The preferred sitting/lying carriage with the sitting device in the form of an animal body is essentially a sitting stroller or riding stroller, in which the child can sit as if sitting in a saddle on the sitting device configured in the form of an animal body, for example, like on a little pony. The animal body is coupled with the wheel rods of the underframe and via these in turn to the wheels via the extremities of the animal body, which represent two forelegs and hind legs each, for example, in the case of a four-legged animal A desired sitting height for the child, located at a sufficiently spaced location from the ground, can be obtained by means of elongated extremities. The term extremity may be defined in the sense of the present invention as any type of extension, projection, appendage or protuberance, which projects beyond the basic body of the torso or over an outer surface of the torso.

The at least two torso sections may be arranged next to each other one after another in relation to a principal axis representing a longitudinal axis of the animal body. Depending on the arrangement, the torso sections accordingly define a right torso section and a left torso section or a front torso section and a rear torso section. To obtain as natural and attractive design of the animal body as possible, the torso sections are preferably provided with a coating or cover and are not therefore visible when viewing the baby carriage or stroller from the outside. In addition, the cover may be lined with a soft material and/or the torso sections may be upholstered.

Due to the upward and downward movement of the torso sections, a movement, as it happens during the movement of an animal, can especially advantageously be recreated or imitated during the pushing of the sitting/lying carriage, A child sitting on the sitting/lying carriage is imparted the feeling as if he or she were riding. The sitting/lying carriage according to the present invention therefore represents not only a transportation device for children, but at the same time also a fun device, toy and sports equipment. Special advantages arise due to the sitting/lying carriage according to the present invention due to the fact that an upright posture of the child is promoted and the sitting child is prompted to move spontaneously while responding to the movements generated in the animal body. The sitting/lying carriage according to the present invention thus anticipates the child's play instinct as well as the child's urge to move. At the same time, the child's muscles are strengthened with the sitting/lying carriage according to the present invention in a manner that is correspondingly appropriate for the child, as a result of which an improved posture of the child, which is especially gentle for the spine, can be promoted.

To recreate the movement of animals, especially the movement of four-legged animals, as naturally as possible and thus to reinforce the feeling of riding for the child sitting on the animal, the torso 6a has, according to a preferred embodiment of the present invention, at least four movably interconnected torso sections. The torso sections are preferably arranged one after another in pairs in relation to the principal axis representing the longitudinal axis of the animal body and they therefore form two front torso sections and two rear torso sections. Each torso section is preferably coupled with the underframe via an extremity each. A pattern of running or gait of an animal can preferably be recreated hereby especially well. For example, just as in case of a galloping horse, a front, right torso section can be moved upward simultaneously with a left rear torso section, while the front left torso section and the rear right torso section are moved downward and vice versa.

The torso sections are preferably interconnected movably via elastic elements provided for this purpose, especially via spring elements. Any type of band-shaped, rod-shaped or strip-shaped or essentially spherical or oval elements made of an elastic material may be used as elastic elements providing that a movable but secure connection of the torso sections is established by these elements. Spring elements with a predefined spring force or tension are especially preferably used for the movable connection of the torso sections. To prevent a potential risk of injury especially when spring elements are used, the spring elements are preferably provided with a cover, for example, with a cover made of a textile material.

It is likewise conceivable that the individual torso sections are interconnected such that the intermediate spaces or joints of the torso sections arranged in a predefined manner are filled with an injected elastic, curable plastic material and the movable connection is brought about by means of the cured plastic material, which continues to be elastic as before.

Special advantages arise from the fact that each wheel is fixably connected to the wheel rod, each wheel being mounted in a rotatingly movable manner on the wheel rod in a predefined idle position and being fixed secured against rotation against the wheel rod in a predefined fixed position and thus being arranged stationarily in relation to the wheel rod. The idle position thus represents a type of inoperative position, in which the wheel rod is not set into rotation by the rotary movement of the wheels. The rotary movement of the wheels is uncoupled in this idle position or inoperative position from the wheel rod and an upward and downward movement of the torso sections does not take place. A movement in the torso 6a can therefore be uncoupled, released or switched off in the idle position, so that the baby carriage or stroller according to the present invention can also be used especially advantageously for transporting a resting or sleeping child in this idle position or inoperative position.

According to a preferred embodiment of the present invention, each wheel rod extends along a respective axis of rotation and the at least one coupling device is configured in the form of a first coupling section, the first coupling section having a first coupling axis extending essentially parallel to the axis of rotation. Axial sections extending coaxially with the axis of rotation adjoin the coupling section. In addition, each wheel rod has especially preferably a second coupling section, wherein the second coupling section has a second coupling axis extending essentially parallel to the axis of rotation. According to an especially preferred embodiment, the first and second coupling axes likewise extend parallel to one another. The first and second coupling sections are especially preferably arranged opposite each other in relation to the axis of rotation and are oriented in relation to the axis sections such that the axis of rotation and the first coupling axis and the second coupling axis are accommodated in a common plane.

The coupling sections may also be defined according to the present invention as essentially U-shaped bulges or bent-out sections of the wheel rod, which are preferably located opposite each other in relation to the axis of rotation. As an alternative, the bulges or bent-out sections may also be arranged offset in relation to one another, namely, such that the axis of rotation and the first coupling axis come to lie in a first plane and the axis of rotation and the second coupling axis come to lie in a second plane, the first and second planes intersecting along the axis of rotation and forming a predefined angle of, e.g., about 90°. According to another alternative embodiment, the bulges or bent-out sections may be arranged such that the first and second coupling axes coincide in a common axis.

To couple the extremities to the wheel rods, cuff-like sleeve elements are provided according to a preferred embodiment of the present invention, the cuff-like sleeve elements being permanently connected to a free end of the extremities and a coupling section each of the wheel rod being preferably received rotatably in each cuff-like sleeve element. The wheel rod, especially the coupling sections of the wheel rod, are mounted rotatably or also slidingly in the cuff-like sleeve elements, such that rotation of the wheel rod about the axis of rotation can take place in an easy-running and unhindered manner.

Especially movement in the manner of riding can be imitated with the baby carriage or stroller according to the present invention by the above-described preferred embodiment and arrangement of the coupling sections combined with the cuff-like sleeve elements for coupling the animal body with the wheel rods. When pushing the baby carriage or stroller forward, the wheels are moved and set into rotary motion. The rotary motion of the wheels brings about, in turn, the rotation of the wheel rods. The rotary motion of the wheel rods is finally transmitted to the coupled extremities by means of the coupling sections mounted rotatingly movably in the cuff-like sleeve elements and converted at the same time into an upward and downward movement, which is introduced via the extremities into the torso sections.

As a result, the torso sections are moved with mutually opposite motions, especially upward and downward motions relative to one another, as a result of which the movement of an animal torso 6a, especially of the back of an animal is imitated during the movement thereof. It is obvious that the mutually opposite upward and downward movements in the sense of the present invention represent partial motions of a more complex movement pattern, and the torso sections are not moved exclusively vertically by the rotation of the wheel rods. The rotation of the wheel rod imparts a rotation of the coupling sections about the axis of rotation, which can in turn also introduce a motion component in the horizontal direction into the torso sections in addition to the vertical motions.

Damping elements, preferably hinge elements, which are used to buffer or damp the movements of the torso sections, are especially preferably provided in the area of the extremities. The damping elements, especially hinge elements, are preferably arranged in the extremities similarly to the joints of a natural animal skeleton, for example, analogously to the ankle joint, fetlock, carpal or knee joints of an animal. Especially jerky, violent movements in the torso 6a of the animal can be avoided by the damping elements. It was likewise found to be favorable for the development of an as natural and cushioned movement as possible and for a round, soft movement pattern to articulate the extremities to the torso sections. This is possible especially with a movable or elastic or articulated fastening device.

The animal body is especially preferably a horse body, and the gait of a horse is imitated here with the mutually opposite movements of the torso sections, which are generated on the basis of the travel motion of the baby carriage or stroller. For example, stepping, trotting or galloping movements of a horse can be imitated by a predefined arrangement of the coupling sections of the wheel rods.

According to an alternative preferred embodiment of the present invention, each wheel rod has a two-part configuration, wherein a first wheel rod part and a second wheel rod part are plugged one into another via a changeover plug-in element provided for this purpose in order to form the wheel rod. For example, it is possible due to this two-part configuration of the wheel rod to change the arrangement of the coupling sections of a wheel rod in relation to one another and to change over by means of this arrangement from one gait to another.

To make it possible to protect a child sitting in a baby carriage or stroller from the effects of weather, for example, the sun, rain or wind, a hood is preferably additionally provided on the baby carriage or stroller, the hood being fastened to the sitting device or to the underframe and the hood preferably having a collapsible and/or foldable configuration.

For reasons of safety and comfort, a seat back is preferably additionally provided in the area of the sitting device, said seat back preferably having an adjustable configuration. For example, the seat back may be configured such that it can be adjusted from a sitting position into a lying position preferably over a plurality of levels. A seat back that can be set into a lying position is especially advantageous especially in embodiments in which the movement of the torso sections can be uncoupled or turned off via an idle position of the wheels, because a reclining surface can be created for the resting child.

The seat back may further be provided, for example, with a sitting section, which may be configured especially preferably in the form of a saddle. Additional safety is offered for the child by lateral support rests, which may likewise be present in the area of the sitting device. Corresponding sitting aids, which are arranged in the area of the torso, may also be provided in alternative embodiments.

The present invention will be explained in more detail below on the basis of exemplary embodiments in connection with the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1A:
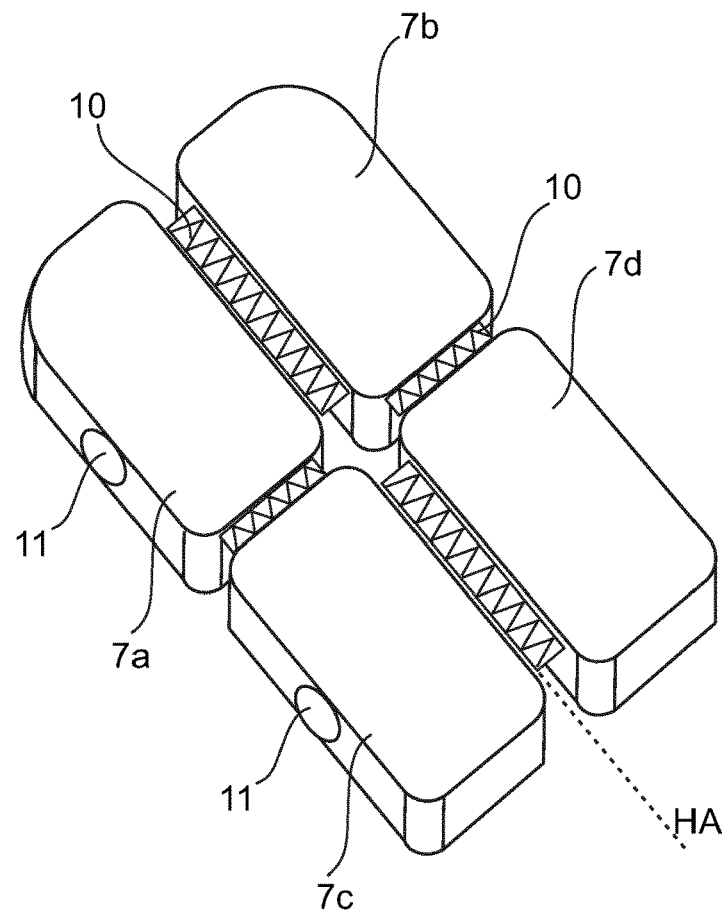
FIG. 1a is a highly schematic representation of a perspective view of four movably interconnected sitting/lying support elements.
Figure 1B:
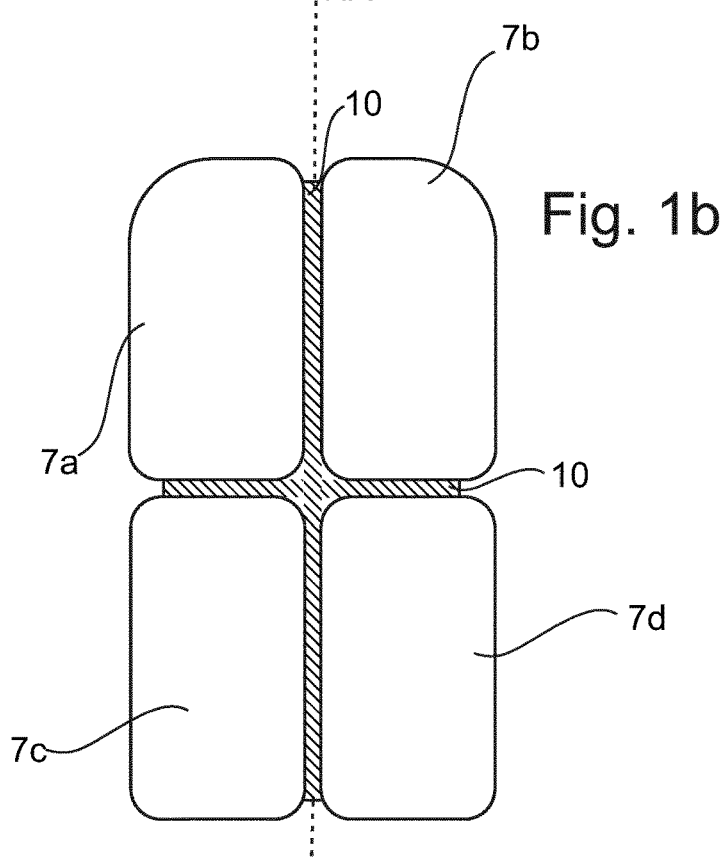
FIG. 1b is a schematic top view of four movably interconnected sitting/lying support elements.

Referring to the drawings, FIGS. 1a and 1b show the sitting/lying support elements 7a, 7b, 7c, 7d movably interconnected by means of elastic elements 10 in an isolated form, the sitting/lying support elements 7a, 7b, 7c, 7d being shown in a perspective view in FIG. 1a and in a top view in FIG. 1b. In the example according to FIG. 1b, the four sitting/lying support elements 7a, 7b, 7c, 7d are connected to one another by means of an elastic element 10 having an essentially cross-shaped configuration, whereas four spring elements 10 are provided in FIG. 1a for the respective connection of sitting/lying support elements 7a, 7b, 7c, 7d arranged adjacent to each other.

The individual sitting/lying support elements 7a, 7b, 7c, 7d have an essentially cuboid configuration, and corresponding roundings and/or bevels are provided on the sides and edges in order to guarantee a pleasant basic shape for the user. A front pair of sitting/lying support elements 7a, 7b and a rear pair of sitting/lying support elements 7c, 7d are arranged one behind the other relative to the principal axis HA, the front pair of sitting/lying support elements 7a, 7b being provided for connection to a front pair of bearing elements 8.1, 8.2 (see FIG. 2) and the rear pair of sitting/lying support elements 7c, 7d being provided for connection to a rear pair of bearing elements 8.3, 8.4 (see FIG. 2). Each of the sitting/lying support elements 7a, 7b, 7c, 7d has a fastening device 11 for a bearing element for this purpose. The fastening devices 11 are arranged each laterally at the sitting/lying support elements 7a, 7b, 7c, 7d in the example shown in FIG. 1a.

Figure 2:
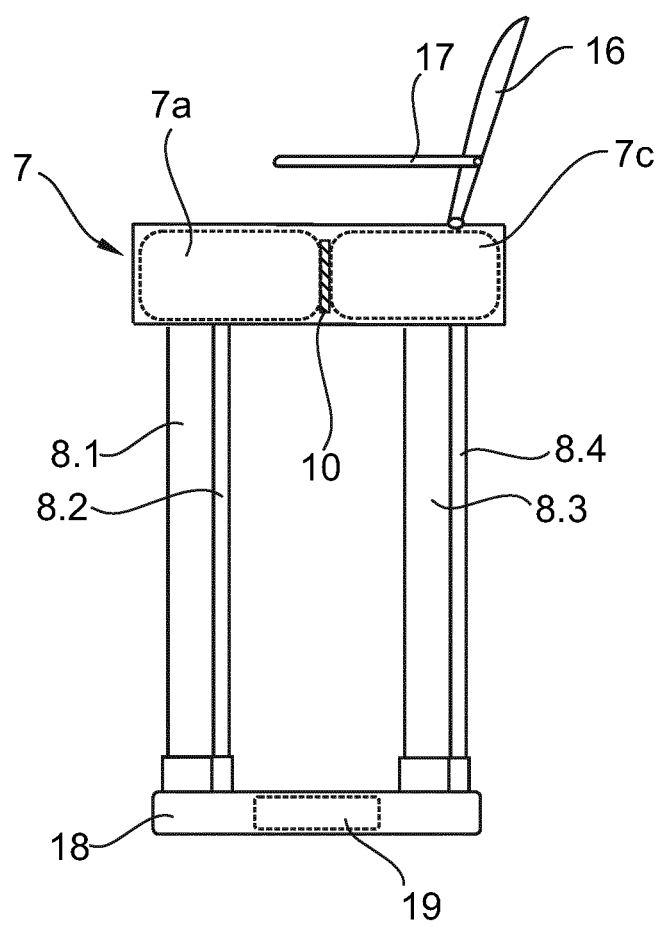
FIG. 2 is a lateral view of a high chair with a sitting/lying support according to an embodiment of the present invention.

In a simplified schematic view, FIG. 2 shows a lateral view of a high chair with a sitting/lying support according to one embodiment of the present invention. The sitting/lying support built up from four sitting/lying support elements 7a, 7b, 7c, 7d is connected to a seat back 16, and each of the movably interconnected sitting/lying support elements 7a, 7b, 7c, 7d is connected to a leg 8.1, 8.2, 8.3, 8.4 for mounting on a support. In addition, lateral support rests 17 are arranged at the seat back 16. The sitting/lying support is used as a sitting surface of a chair in this embodiment. At least one leg 8.1, 8.2, 8.3, 8.4 may preferably be equipped here with a spring element (not shown). The legs 8.1, 8.2, 8.3, 8.4 are connected to a drive element 19 arranged in a base element 18 such that the legs 8.1, 8.2, 8.3, 8.4 can be set into an upward and downward movement by the drive element 19 independently from one another. The upward and downward movement is preferably a more complex movement pattern with vertical and horizontal direction components that can be combined as desired, so that the upward and downward movements are defined according to the present invention as a three-dimensional movement pattern. The three-dimensional movement pattern has, for example, upward, downward, forward and rearward directed direction components and may especially preferably also comprise lateral motion components or tilting motions. The upward and downward motions of the legs 8.1, 8.2, 8.3, 8.4, which are generated by means of the drive element 19, and transmitted to or introduced directly into the sitting/lying support elements 7a, 7b, 7c, 7d, so that the movement of the sitting/lying support can be driven and preferably controlled. A chair, which can advantageously be used in physical therapy treatments, is made available with this embodiment.

Figure 3:
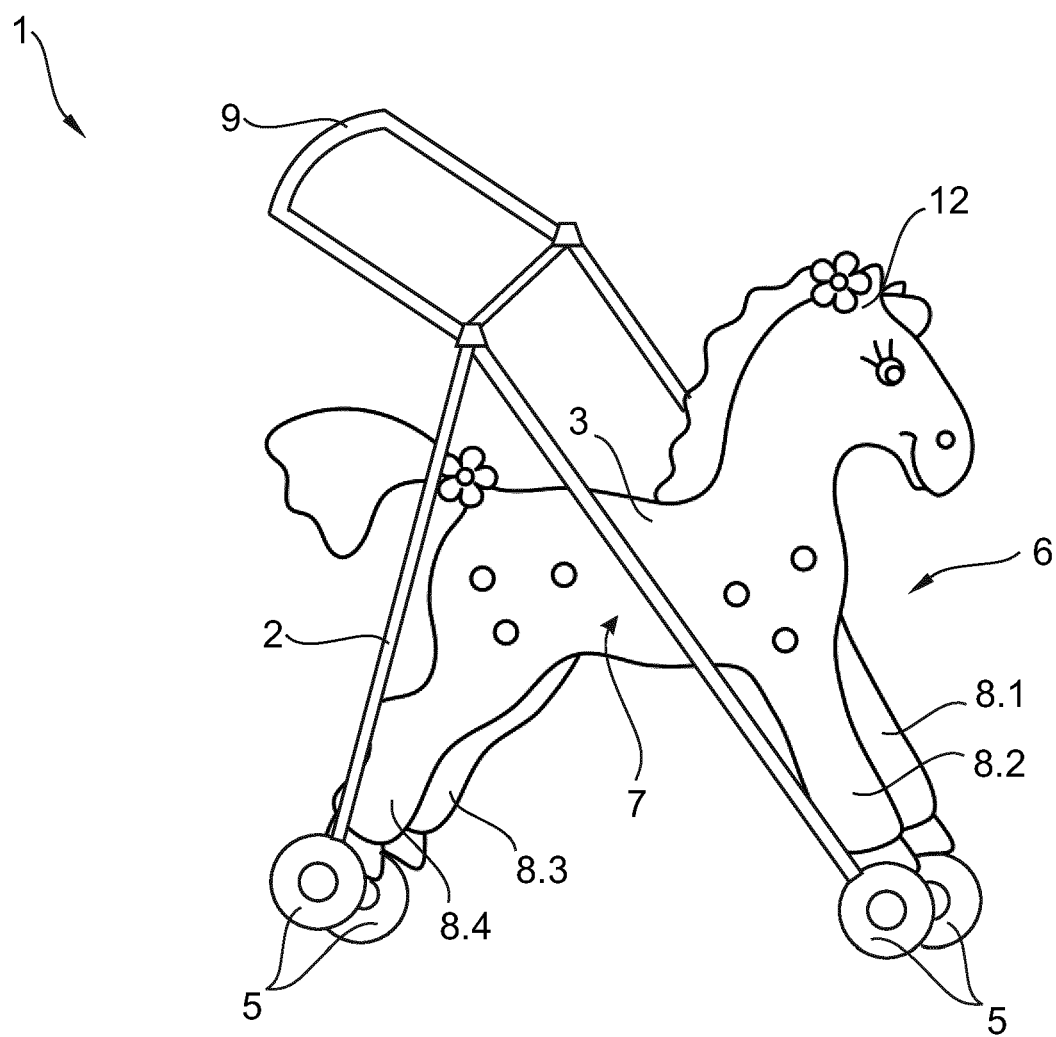
FIG. 3 is a simplified schematic representation of a view of a baby carriage or stroller.

FIG. 3 shows in a simplified schematic representation a view of a baby carriage or stroller 1. The baby carriage or stroller 1 has an underframe 2 and a sitting device 3 coupled with the underframe 2. The sitting device 3 is configured in the form of an animal body 6, the animal body being a horse body in the example being shown.

The horse body 6 comprises a torso 6a, a head 12 and four extremities 8.1, 8.2, 8.3, 8.4, which represent the forelegs and hind legs of the horse body 6. The torso 6a, also called trunk, forms a sitting area for a child, such that the child can sit astride on the horse body 6. The head 12 may assume, for example, a securing or support function, because the child can hold onto it comfortably. Separate handles or holding bands may, for example, optionally additionally be provided on the head 12.

The underframe 2 comprises at least two wheel rods 4 (not shown in FIG. 1, see FIGS. 4a, 4b) and wheels 5 connected to the wheel rods 4. The underframe 2 further has a push handle piece 9, which has an adjustable configuration in the example being shown, so that it can be set individually for the purpose of ensuring that the person pushing the baby carriage or stroller 1 can hold his or her arms and hands comfortably. Even though not shown in FIG. 3 for reasons of clarity, a hood may further be provided on the baby carriage or stroller for protection against light, wind and/or rain, said hood preferably having an adjustable, especially collapsible and/or foldable configuration. A sitting aid, which is configured, for example, in the form of a saddle, may likewise preferably be arranged in the area of the torso.

Figure 4:
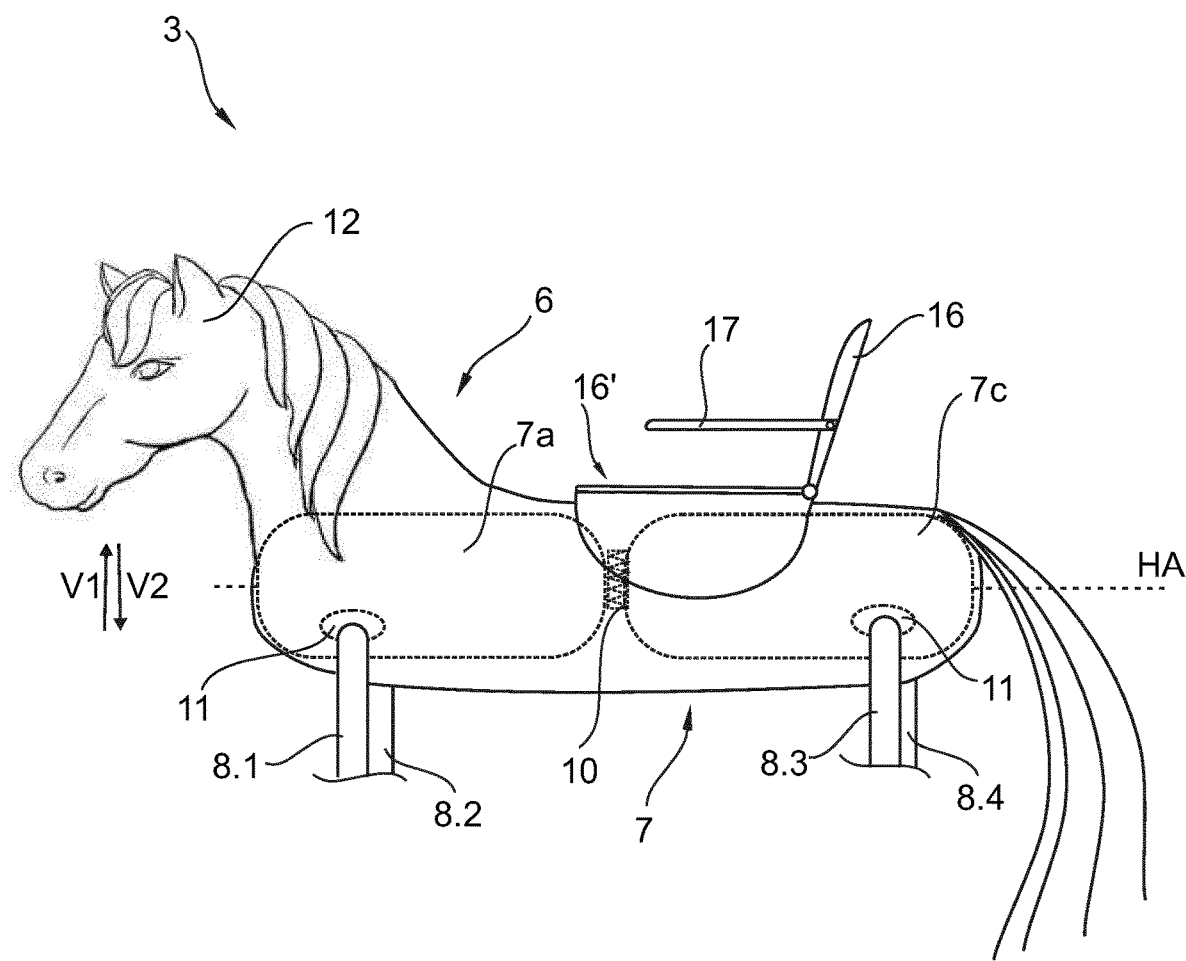
FIG. 4 is a lateral view of a sitting device configured in the form of an animal body according to an embodiment of the present invention.

FIG. 4 shows a lateral view of a detail of a sitting device 3 configured in the form of a horse body 6 according to a preferred embodiment of the present invention. To obtain an as natural outer appearance of the horse body 6 as possible, which is as attractive for children as possible, the correspondingly shaped horse body 6 is provided with a fur-like, textile cover. The fur-like, textile cover or coating is additionally lined, especially in the area of the torso that forms the sitting area for the child, with a soft, preferably at least partially elastic material, for example, with a foam-like material. In particular, a soft and comfortable sitting surface as well as soft lateral contact and support surfaces are provided hereby for the legs of the child.

The torso 6a comprises according to the present invention at least two movably interconnected torso sections 7a, 7b, 7c, 7d, which are not visible from the outside due to the fur-like, textile cover or coating and are therefore indicated by dash-dotted line in FIG. 4. In the example according to FIG. 4, the torso 6a comprises four torso sections 7a, 7b, 7c, 7d, which are arranged one behind the other in pairs of two relative to a principal axis HA of the horse body 6, which axis forms the longitudinal axis of the body. The section 7a suggested in FIG. 4 represents a front left torso section and the suggested torso section 7c represents a rear left torso section. Analogously to this, the torso 6a of the example being shown has a right front torso section as well as a right rear torso section, which are not, however, visible in the lateral view shown in FIG. 4.

The torso sections 7a, 7b, 7c, 7d are made of an essentially solid material; they are manufactured from a hard rubber in this example. The torso sections 7a, 7b, 7c, 7d are movably interconnected by means of elastic elements 10, which are configured in the form of spring elements in this example. The spring elements 10 are fastened to the respective torso sections 7a, 7b, 7c, 7d to be interconnected via suitable fastening devices and are configured and set up to allow upward and downward motions V1, V2 of the torso sections 7a, 7b, 7c, 7d, which motions are directed opposite each other. The upward and downward motions V1, V2 of the torso sections 7a, 7b, 7c, 7d may also be defined here as opposite or opposing motions, which have especially vertical and horizontal direction components, so that the upward and downward motions may be defined here as a three-dimensional movement pattern.

The horse body 6 has four extremities 8.1, 8.2, 8.3, 8.4, the extremities 8.1 and 8.3 representing the left foreleg and the left hind leg of the horse body 6, respectively. The extremities 8.1, 8.2, 8.3, 8.4 are connected to the torso sections 7a, 7b, 7c, 7d by means of fastening devices 11 provided and set up for this purpose, the left foreleg 8.1 being connected to the front left torso section 7a and the left hind leg 8.3 being connected to the rear left torso section 7c. The extremities 8.1, 8.2, 8.3, 8.4 are articulated to the torso sections 7a, 7b, 7c, 7d by means of articulated fastening devices in the example being shown.

For an improved sitting comfort but also for reasons of safety, the sitting device 3 according to the example being shown further comprises an adjustable seat back 16 as well as lateral support rests 17, by which the child can additionally be supported and secured. The seat back 16 may be configured, as is being shown here, in conjunction with a sitting section 16', said sitting section 16' having, for example, the form of a saddle.

Figure 5A:
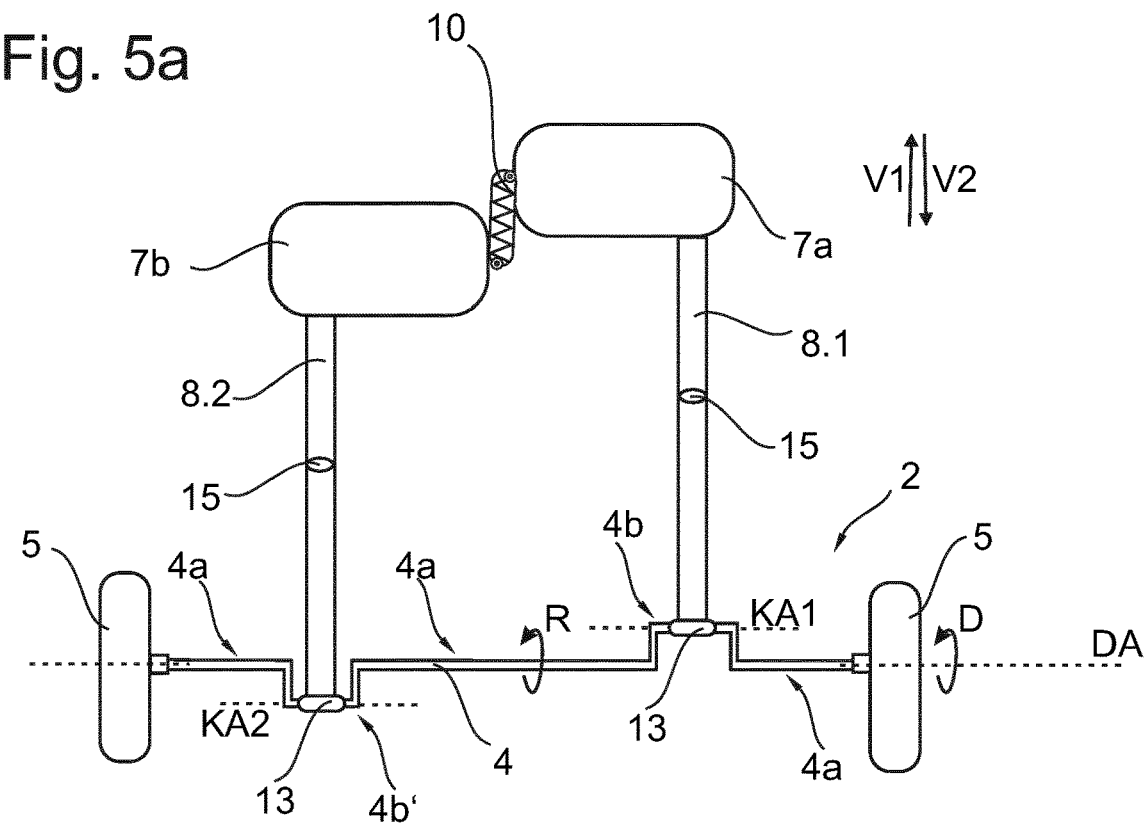
FIG. 5a is a schematic detail of torso sections and of an underframe of a preferred embodiment.

FIG. 5a shows a schematic detail of the front torso sections 7a, 7b with connected front extremities 8.1, 8.2 and of the underframe 2 according to a preferred embodiment of the present invention. The front extremities 8.1, 8.2, are connected to the torso sections 7a, 7b at an area forming an underside of the torso sections 7a, 7b. Each wheel rod 4 is rotatable according to the present invention about an axis of rotation DA of the wheels 5 and has a coupling device, which is arranged outside the axis of rotation DA, so that a rotation R of the wheel rod 4, generated by the rotary motion D of the wheels 5, can be converted into opposite upward and downward motions V1, V2 of the torso sections 7a, 7b based on a corresponding coupling of the horse body 6 with the coupling device.

For this, the wheel rod 4 of the underframe 2, which wheel rod extends along the axis of rotation DA of the wheels 5, has a first coupling section and a second coupling section, 4b, 4b', respectively, for coupling the extremities 8.1, 8.2 as well as axle sections 4a adjoining the coupling sections 4b, 4b'. The axle sections 4a extend coaxially with the axis of rotation DA, and the first and second coupling sections 4b, 4b' have a first and second coupling axis KA1, KA2 each, which extend essentially parallel to the axis of rotation DA, the first and second coupling axes KA1, KA2 being likewise oriented parallel to one another. The first and second coupling sections 4b, 4b' are arranged opposite each other in relation to the axis of rotation DA and are oriented in relation to the axle sections 4a such that the axis of rotation DA and the first and second coupling axes KA1, KA2 are accommodated in a common plane. The first and second coupling sections 4b, 4b' may also be defined here as essentially U-shaped bulges or bent-out sections or as U-shaped coupling sections, which are located opposite each other in relation to the axis of rotation DA.

Cuff-like sleeve elements 13 are provided for effectively coupling the extremities 8.1, 8.2 to the wheel rod 4, a coupling section 4b, 4b' being mounted rotatably or rotatingly movably in each cuff-like sleeve element 13. Based on the coupling of the extremities 8.1, 8.2 via the cuff-like sleeve element 13, it is achieved by the above-described, preferred configuration and arrangement of the coupling sections 4b, 4b' that the torso sections 7a, 7b are moved upward and downward opposite each other during rotation R of the wheel rod 4 about the axis of rotation DA.

Figure 5B:
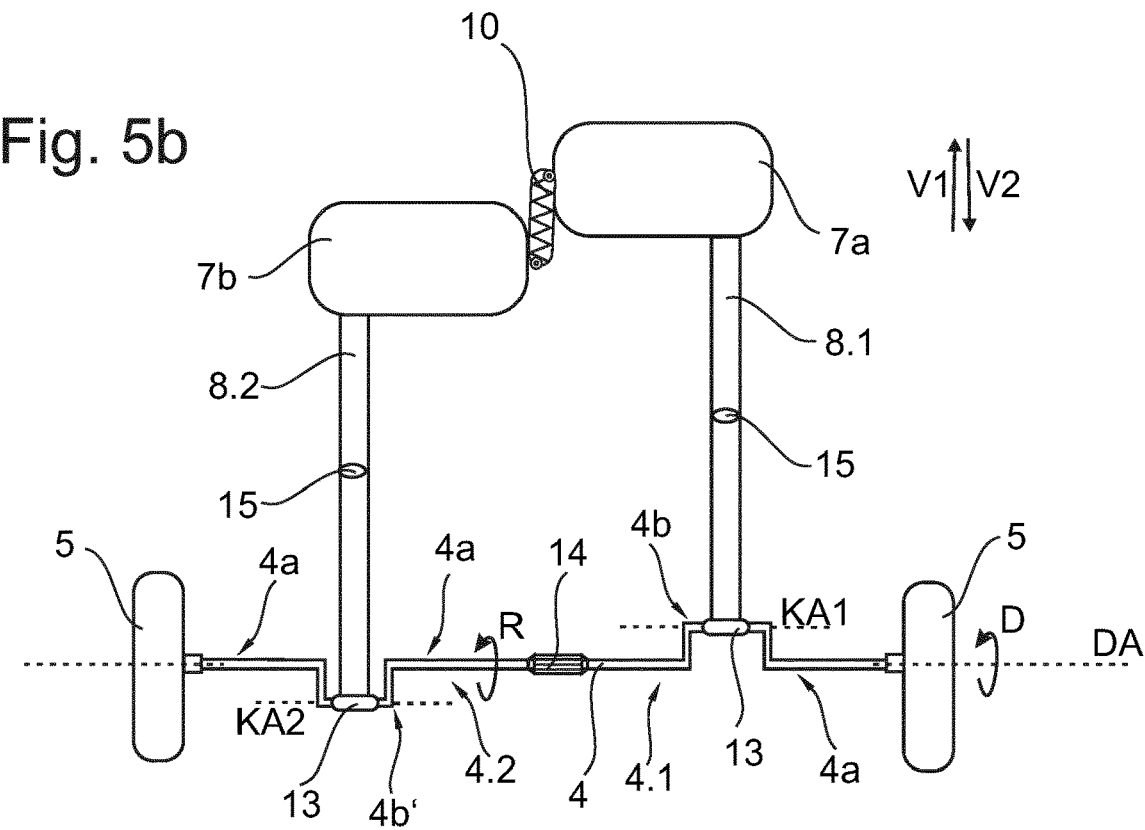
FIG. 5b is a schematic detail of torso sections and of an underframe of another preferred embodiment.

The embodiment according to FIG. 5b differs from that in FIG. 5a in that the wheel rod 4 has a two-part configuration and comprises a first wheel rod part and a second wheel rod part 4.1, 4.2, respectively. The first and second wheel rod parts 4.1, 4.2 are plugged one into the other and connected via a changeover plug-in element 14 provided for this purpose in order to form the wheel rod 4. The first coupling section 4b is formed here in the first wheel rod part 4.1 and the second wheel rod part 4.2 has the second coupling section 4b'. The two wheel rod parts 4.1, 4.2 can be connected to one another via the changeover plug-in element 14 in different orientations in relation to one another and in different settings. It is possible, for example, to connect the two wheel rod parts 4.1, 4.2 such that the axis of rotation DA and the first coupling axis KA1 are accommodated in a first plane and the axis of rotation DA and the second coupling axis KA2 are accommodated in a second plane, the first and second planes intersecting in the area of the axis of rotation DA. As an alternative, the two wheel rod parts 4.1, 4.2 may be connected such that the first and second coupling axes KA1, KA2 coincide in a common axis.

Figure 6:
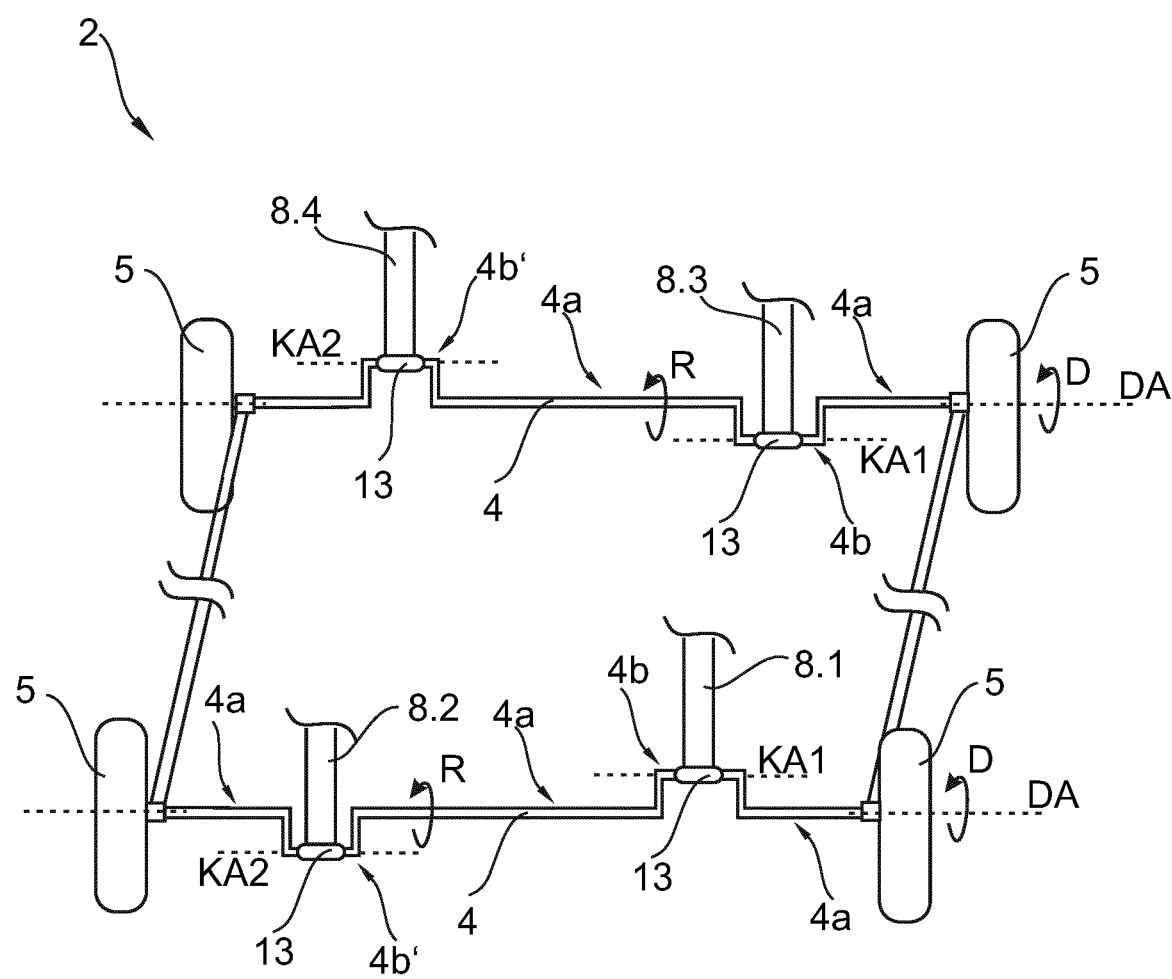
FIG. 6 is a perspective front view of an embodiment of the underframe.

A certain gait of the horse can, for example, be imitated when pushing the baby carriage or stroller 1 through a corresponding arrangement of the two wheel rods 4 provided, namely, the front and rear wheel rod 4, especially in respect to a respective direction and orientation of the coupling sections 4b, 4b'. An arrangement of the front and rear wheel rods 4, with which a galloping movement can be imitated, shall be illustrated as an example on the basis of FIG. 6, which shows a highly schematic perspective front view of the underframe 2.

When pushing the baby carriage or stroller 1 forward, the front right extremity 8.2 and the rear left extremity 8.3 are moved downward based on the rotary motion D of the wheels 5 and mediated by the rotation R of the wheel rod 4 about the respective axis of rotation DA and the front left extremity 8.1 and the rear right extremity 8.4 are moved upward at the same time, just as it is done by a galloping horse. It is possible to change over from one gait to another gait as desired and to also imitate, for example, a stepping movement or trotting movement by means of wheel rods 4 having a two-part configuration according to the preferred embodiment shown in FIG. 4b.

While specific embodiments of the invention have been shown and described in detail to illustrate the application of the principles of the invention, it will be understood that the invention may be embodied otherwise without departing from such principles.

The invention claimed is:

1. A sitting/lying support comprising:
   at least four movably interconnected sitting/lying support elements;
   at least one bearing element, wherein the bearing element is connected to the sitting/lying support elements such that a movement of the sitting/lying support elements relative to one another can be produced, wherein the connection of the bearing elements to the sitting/lying support elements is provided and configured for moving the sitting/lying support elements relative to one another; and
   elastic elements, wherein the sitting/lying support elements are movable interconnected via the elastic elements.

2. A sitting/lying support in accordance with claim 1, wherein the at least one bearing element comprises a plurality of bearing elements comprising frame struts of a sitting/lying carriage, a baby carriage or stroller, legs or elastic connection elements.

3. A sitting/lying support in accordance with claim 2, wherein each of the movably interconnected sitting/lying support elements is connected via at least one respective connection element to a spherical lower part, wherein the spherical lower part is mounted movably in a hollow spherical shell and the hollow spherical shell is connected to at least one leg element for mounting on a support.

4. A sitting/lying support in accordance with claim 3, wherein the at least one leg element is equipped with a spring element.

5. A sitting/lying support in accordance with claim 2, wherein the sitting/lying support is connected to a seat back, wherein each of the movably interconnected sitting/lying support elements is connected to at least one leg for mounting on a support.

6. A sitting/lying support in accordance with claim 5, further comprising at least one drive element, wherein the legs are connected to the at least one drive element such that the legs can be set into an upward and downward movement independently from one another by the drive element.

7. A sitting/lying support in accordance with claim 6, wherein upward and downward movements of the legs are generated by means of the drive element and are directly transmitted to the sitting/lying support elements or are introduced into same, so that movement of the sitting/lying support is driven under control.

8. A sitting/lying support in accordance with claim 1, wherein the bearing element forms a support of the sitting/lying support element.

9. A sitting/lying support in accordance with claim 1, wherein the sitting/lying support element moves upward and downward movements with horizontal movement components.

10. A sitting/lying carriage comprising a sitting/lying support comprising:
   at least four movably interconnected sitting/lying support elements;
   at least one bearing element connected to the sitting/lying support elements such that a movement of the sitting/lying support elements relative to one another can be produced wherein the connection of the bearing elements to the sitting/lying support elements is provided and configured for moving the sitting/lying support elements relative to one another;
   a sitting area, wherein:
      the sitting/lying device is configured in the form of an animal body with a torso forming the sitting area;
      the movably interconnected sitting/lying support elements are configured as movably interconnected torso sections; and
      the animal body has a gait represented with mutually opposite movements of the torso sections, which mutually opposite movements of the torso sections are generated with travel motion of the sitting/lying carriage.

11. A sitting/lying carriage in accordance with claim 10, further comprising at least one underframe, wherein:
   the sitting/lying support is a part of a sitting/lying device, which is coupled with the underframe;
   the underframe comprises at least two wheel rods and wheels connected to the wheel rods;
   each of the movably interconnected sitting/lying support elements is coupled to the underframe via at least one frame strut.

12. A sitting/lying carriage in accordance with claim 11, wherein:
   each wheel rod is rotatable about an axis of rotation of the connected wheels and is equipped with at least one coupling device arranged outside the axis of rotation for coupling the frame struts;
   a rotation of the wheel rods is generated by a rotary movement of the wheels; and
   a generated rotation of the wheel rods is converted into opposite upward and downward movements of the movably interconnected sitting/lying support elements by means of the coupling of the frame struts with the coupling devices of the wheel rods.

13. A chair for use in physical therapy treatments, the chair comprising a sitting/lying support comprising:
   at least four movably interconnected sitting/lying support elements; and
   at least one bearing element connected to the sitting/lying support elements such that a movement of the sitting/lying support elements relative to one another can be produced wherein the connection of the bearing elements to the sitting/lying support elements is provided and configured for moving the sitting/lying support elements relative to one another, wherein:
      the at least one bearing element comprises a plurality of bearing elements;
      the bearing elements form a support of the sitting/lying support element;
      the sitting/lying support element move upward and downward with horizontal movement components; and
      the sitting/lying support elements further comprise elastic elements;
      the sitting/lying support elements are movably interconnected via the elastic elements.

14. A chair in accordance with claim 13, further comprising at least one drive element, wherein the bearing elements are connected to the at least one drive element such that the bearing elements can be set into an upward and downward movement independently from one another by the drive element.

15. A chair in accordance with claim 14, wherein upward and downward movements of the bearing elements are generated by means of the drive element and are directly transmitted to the sitting/lying support elements or are introduced into same, so that movement of the sitting/lying support is driven under control.

16. A chair in accordance with claim 15, further comprising a support and a seat back, wherein the sitting/lying support is connected to the seat back, wherein each of the movably interconnected sitting/lying support elements is connected to at least one of the bearing elements for mounting the sitting/lying support on the support.

* * * * *